US006744979B2

(12) United States Patent
Moriya

(10) Patent No.: US 6,744,979 B2
(45) Date of Patent: Jun. 1, 2004

(54) LENS-FITTED PHOTO FILM UNIT

(75) Inventor: Mitsuhiro Moriya, Minami-Ashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/155,120

(22) Filed: May 28, 2002

(65) Prior Publication Data

US 2002/0176707 A1 Nov. 28, 2002

(30) Foreign Application Priority Data

May 28, 2001 (JP) .......................................... 2001-159024

(51) Int. Cl.$^7$ ............................................... G03B 17/02
(52) U.S. Cl. ........................................... 396/6; 396/535
(58) Field of Search ................................ 396/6, 535, 29, 396/25

(56) References Cited

U.S. PATENT DOCUMENTS 6,442,342 B1 * 8/2002 Fredlund et al. ................ 396/6

* cited by examiner

*Primary Examiner*—Russell Adams
*Assistant Examiner*—Rochelle Blackman
(74) *Attorney, Agent, or Firm*—Young & Thompson

(57) ABSTRACT

A front cover of a lens-fitted photo film unit is formed of a transparent resin. On an inner surface of the front cover, plural inclinations are formed along outlines of a symbol. The front cover covers a front side of the main body. When the lens-fitted photo film unit is disposed in a light, the light passes through the front cover and is reflected toward an outside on the plural inclinations formed on the inner surface of the front cover. As the light is reflected on the inclinations, the symbol indicated in brilliancy.

10 Claims, 3 Drawing Sheets

US 6,744,979 B2

LENS-FITTED PHOTO FILM UNIT

BACKGROUND OF THE INVENTION

1. Field of the Invention

The present invention relates to a lens-fitted photo film unit, more particularly to a lens-fitted photo film unit in which a logomark, such as a name or a mark of a maker, becomes brilliantly remarkable.

2. Description Related to the Prior Art

In a market is sold a lens-fitted photo film unit in which an unexposed filmstrip is preloaded. The lens-fitted photo film unit is provided with a simple photographic mechanism and popular while a picture is easily photographed with it and it may be brought in a photo finisher after exposure of all frames.

Recently a design of the lens-fitted photo film unit is often improved as to fit to various tastes of users. For example, the lens-fitted photo film unit has a skeleton type of the front cover formed of a transparent resin, and an exposure unit having a photographic mechanism and a flash device can be seen through the front cover.

In the skeleton type, for example, protrusions or retractions are formed on an outer surface of the front cover so as to construct letters or marks symbolizing a producer. However in the skeleton type of the lens-fitted photo film unit has a defect in that the letters and the marks formed by the protrusions or retractions are hardly perceived.

SUMMARY OF THE INVENTION

An object of the present invention is to provide a lens-fitted photo film unit in whose transparent part a logomark is provided so as to be more easily perceived.

The object and the other objects are achieved by forming reflect portions constructing a symbol on an inner face of a transparent member constructing a part of an outer face. The reflect portion is constructed of inclined faces of a V-shaped groove and protrusions. Around the reflect portion, crimp processed portion is formed.

In the preferable embodiment, the V-shaped groove and the projections are formed on an inner surface of the front cover. The front cover is made of plastics mixed with fluorescent dyes.

In the lens-fitted photo film unit of the present invention, the light which has entered in the transparent member is reflected on the reflect portions such that the symbol may become more brilliant and remarkable.

BRIEF DESCRIPTION OF THE DRAWINGS

The above objects and advantages of the present invention will become easily understood by one of ordinary skill in the art when the following detailed description would be read in connection with the accompanying drawings.

PREFERRED EMBODIMENTS OF THE INVENTION

Figure 1:
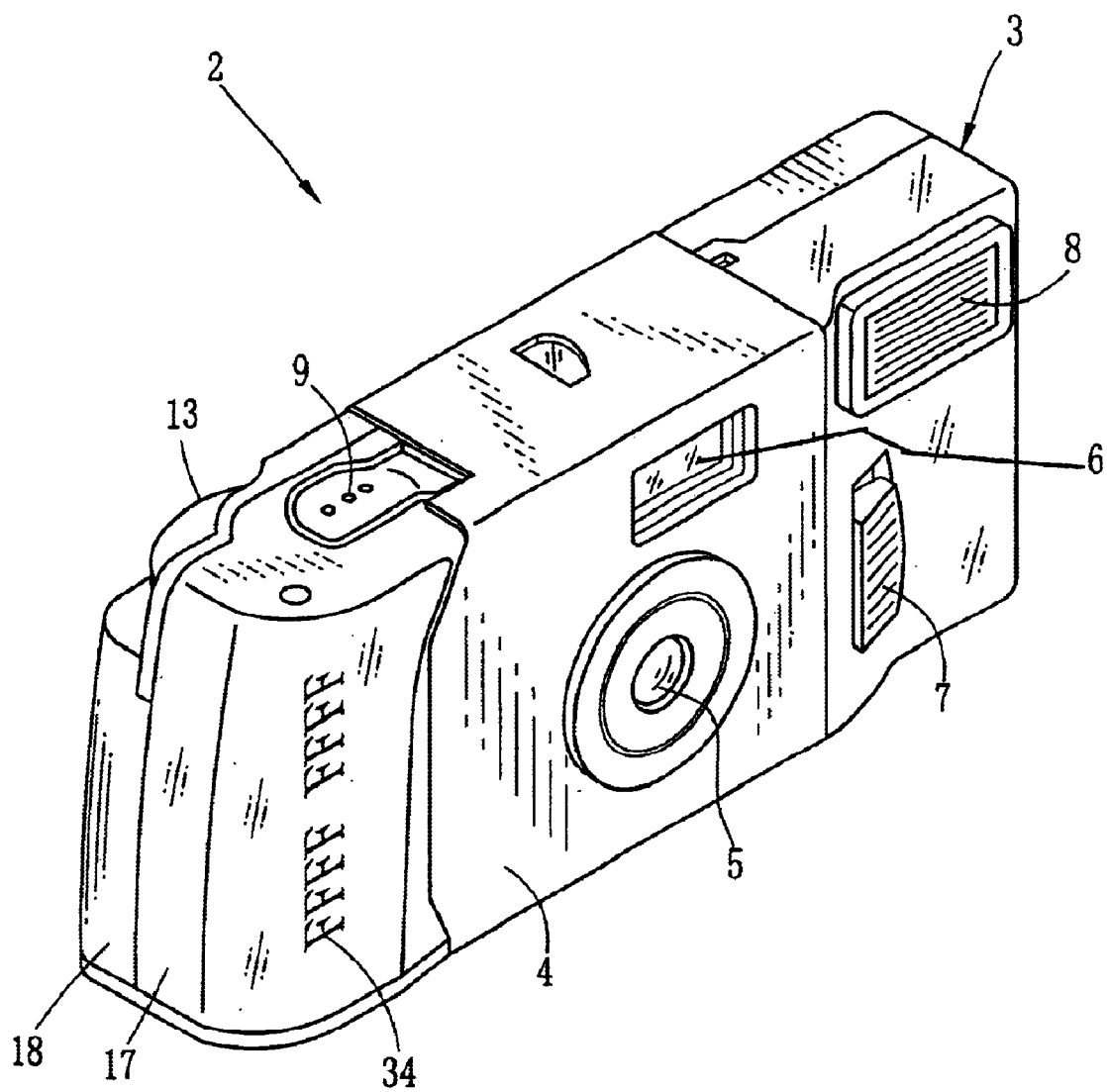
FIG. 1 is a perspective view of a lens-fitted photo film unit of the present invention.

In FIG. 1, a lens-fitted photo film unit 2 is constructed of a unit 3 and an outer sheet 4. The outer sheet 4 is formed of a transparent resin film and wound so as to wrap a central part of the unit 3.

A front surface of the unit 3 is provided with a taking lens 5, a finder objective window 6, a flashlight projector 8 and a flash charger button 7. In an upper surface, there are a shutter release button 9, a film counter window 10 and a flash charging completion indicating lamp 11. In the rear surface, a finder eye-piece window 12 (See, FIG. 2) and a film winding wheel 13 appear.

Figure 2:
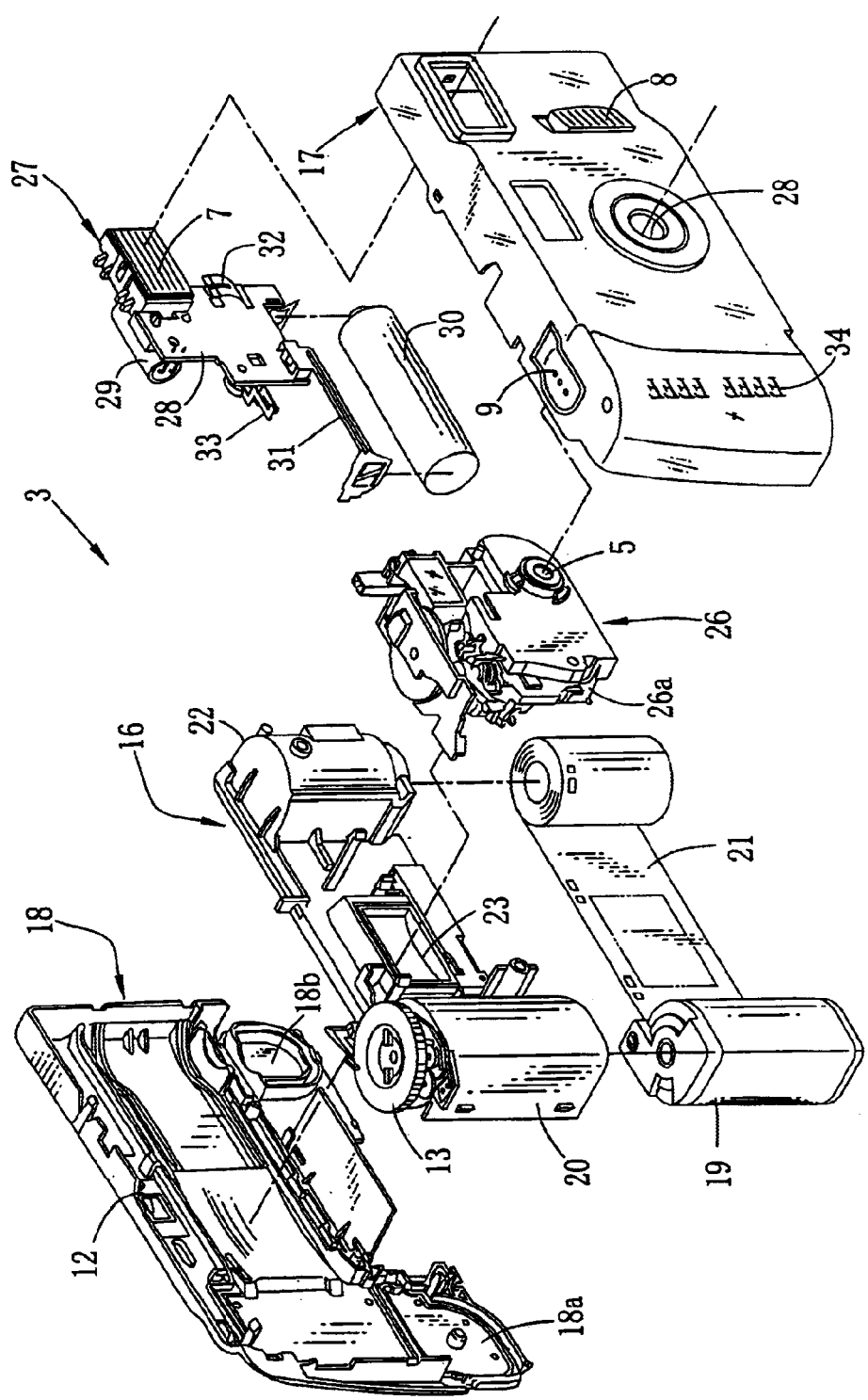
FIG. 2 is an exploded view of the lens-fitted photo film unit in FIG. 1, in which a label is not illustrated.

As shown in FIG. 2, the unit 3 includes a main body 16, the front cover 17 and a rear cover 18. The front cover 17 and the rear cover 18 cover the main body 16. In the main body 16 are formed a cartridge chamber 20 for containing a housing 19 and a film roll chamber 22 for loading a rolled filmstrip 21. Between the cartridge chamber 20 and the film roll chamber 22 there is an exposure aperture 23 determining an exposure area on the filmstrip 21. Each bottom of the cartridge chamber 20 and the film roll chamber 22 has an opening. The opening of the cartridge chamber 20 is closed with a bottom lid 18a, and that of the film roll chamber 22 is closed with a bottom lid 18b. To an upper surface of the cartridge chamber 20, a film winding wheel 13 is attached. In the main body 16 an exposure unit 26 is attached to a front surface of the exposure aperture 23, and a flash unit 27 is attached to an upper side of the film roll chamber 22. The exposure unit 26 includes a shutter base 26a to which a taking lens 5, a finder optical system and a shutter mechanism and the like are attached.

The flash unit 27 has a flash circuit formed on a printed circuit board 28. To the printed circuit board 28 are attached a flashlight projector 7 for emitting a flashlight, a main capacitor 29, a dry battery 30, a battery holder 31, a charging switch 32 and a synchronized switch 33 which all form a part of the flash circuit.

The main body 16, the rear cover 18 and the exposure unit 26 are formed of a light-shielding resin by injection molding. When a rear surface of the main body 16 is covered with the rear cover 18, the filmstrip 21 is kept between the main body 16 and the rear cover 18 in a light-tight fashion. A light from objects passes through the taking lens 5, and thereafter is shielded by the shutter base 26a and the main body 16. Further, the front cover 17 is formed by injection molding of a transparent resin in which a fluorescent dye is mixed, for example, lumogene, hostasol and the like. Instead of the transparent resin, a semitransparent resin may be used such that an inside of the unit 3 may be seen through the front cover 17.

Figure 3:
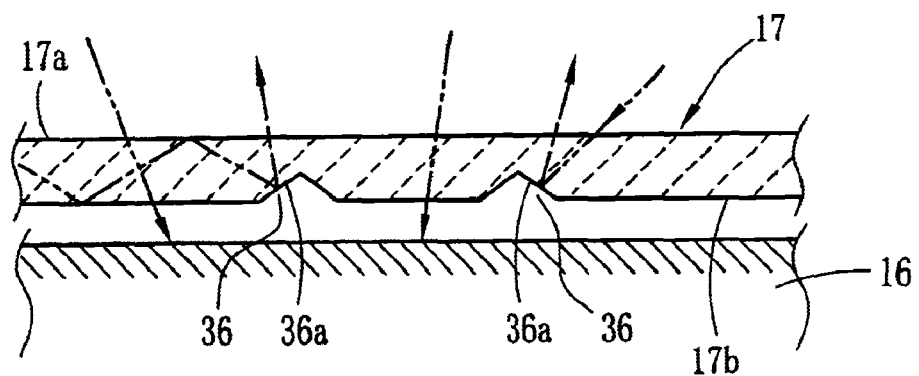
FIG. 3 is a partial sectional view of the lens-fitted photo film unit in FIG. 1.

As shown in FIG. 3, the front cover 17 is confronted to the main body 16. A front surface 17a of the front cover 17 is flat. On a rear surface 17b of the front cover 17, a V-shaped grooves 36 are provided so as to form edges of the logomark 34. As the front cover 17 contains the fluorescent dye, the reflection of the light increases. Note that the front cover 17 may not contain the fluorescent dye.

An effect of the above embodiment will be described now. When the front cover 17 is set in the light, the light passes through a part of the front cover 17 to reach the main body 16. However, as the main body 16 is made of the light-shielding resin, the filmstrip 21 is not exposed in the light. A part of the light in the front cover 17 further extends in the all over the front cover 17. After reflecting on groove walls 36a of the V-shaped groove 36 several times, the part of the light is directed to the outside of the lens-fitted photo film unit 2. Thereby, as the incident angle of the part of the light is small, the part of the light passes through the front cover 17. Further, when the light directly reaches the groove walls 36a, the groove walls 36a reflects the light toward the outside. Thus, the density of the light reflected on the groove walls 36a toward the outside becomes widely larger. Further, the V-shaped grooves 36 are provided in edges of the logomark 34, outlines of the logomark 34 become clearer.

Further, after exposure of all frames, the lens-fitted photo film unit 2 is provided for a photo finisher. In the photo finisher, the exposed filmstrip 21 is unloaded, the unit body 3 is sent to a recycling fabric for recycling and reusing.

Further, there may be a third person who loads a fresh filmstrip in the empty unit 3 to sold it. Thereby the third person cut a part of the front cover 17 to remove the V-shaped groove 36 constructing the logomark 34. However, as formed on a rear surface 17b of the front cover 17 in the present invention, the third person must separate the front cover 17 from the unit 3 in order to remove the V-shaped groove 36. Thus, the arrangement becomes complex. Further, a position where the logomark 34 is cut down becomes unnatural and seen from the outside through the transparent front cover 17. Accordingly, the changing of the filmstrip is prevented.

Figure 4:
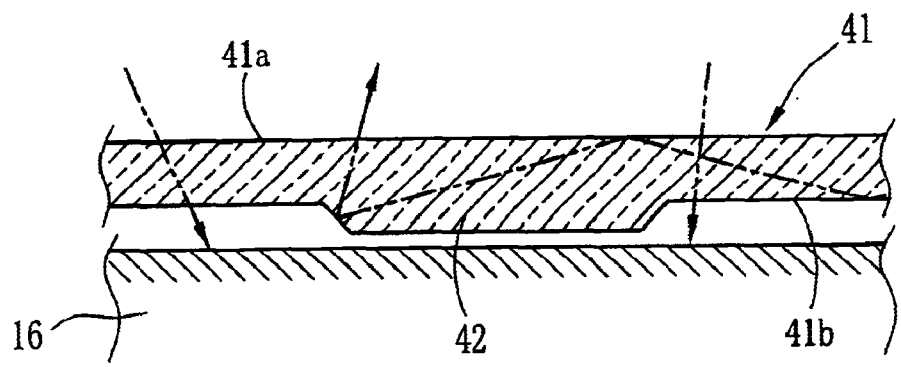
FIG. 4 is a same view as FIG. 3, illustrating a situation in which a light is reflected on protrusions formed on a rear face of a front cover.

As shown in FIG. 4, the logomark 34 may be formed by a protrusion 42 on a rear surface 41a of a front cover 41. The protrusion 42 has inclined faces along edges of the logomark 34. As the light is reflected on the inclined faces the outline of the logomark 34 becomes clearer and more remarkably.

Further, a V-shaped groove a retraction may be formed on a front surface 17a of the front cover 17 in a position corresponding to the logomark 34. The light may be reflected on the V-shaped groove and the protrusion on the front surface 17a, and the V-shaped groove and the protrusion forming outlines of the logomark are also perceived. Thus the logomark 34 becomes much clearer and more remarkable. Further, the side surface of the protrusion 42 and the groove walls 36a of the groove 36 may be perpendicularly formed.

Figure 5:
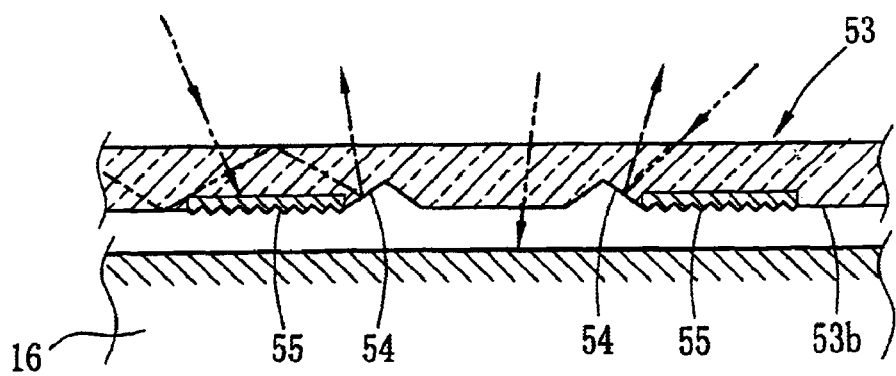
FIG. 5 is a same view as FIG. 3, in which crimps are formed around grooves.

In FIG. 5, crimps 55 are formed around grooves 54 on a rear surface 53b of a front cover 53. The crimp process portion 55 diffuses the light from the outside. A position of the crimp process portion 55 becomes semi-transparent, and therefore the main body 16 is seen with less transparency. Further, through another position of the front cover 17, the main body 16 is seen behind the front cover 53. Therefore, the logomark 34 is more remarkable. Furthermore, the crimp process portion 55 may be also formed around the logomark 34 on a front surface 53a of the front cover 53. Further, a glass may be applied on the V-shaped groove 54 and the protrusion 42 so as to increase the reflectivity.

The logomark 34 may be formed on transparent member which is not restricted in the front cover. As the transparent member there is a protector attached to an emitting surface of the flashlight projector 7, and the shutter release button 9 may be formed of the transparent resin. Further, the present invention may be applied to a water shielding cover for covering the lens-fitted photo film unit 2 in a water-tight fashion or an outer cover for covering the lens-fitted photo film unit 2. The logomark 34 is for example letters, marks and numbers.

Various changes and modifications are possible in the present invention and may be understood to be within the present invention.

What is claimed is:

1. A lens-fitted photo film unit in which an unexposed filmstrip is preloaded, comprising:
   an opaque main body for preloading said filmstrip;
   a front cover attached to a front surface of said main body;
   a transparent rear cover attached to a rear side of said main body; and
   reflect portions provided on an inner surface of said transparent rear cover, said reflect portions forming outlines of a symbol, reflecting an incident light outward of said transparent rear cover for indicating said symbol in brilliancy.

2. A lens-fitted photo film unit as described in claim 1, wherein an inner surface of said transparent member has protrusions protruding in form of said symbol, and inclined faces formed on edges of said protrusions are said reflect portions.

3. A lens-fitted photo film unit in which an unexposed filmstrip is preloaded, comprising:
   an opaque main body for preloading said filmstrip;
   a transparent front cover attached to a front surface of said main body;
   an opaque rear cover attached to a rear side of said main body;
   a transparent member disposed in an outer surface of said lens-fitted photo film unit; and
   reflect portions provided on an inner surface of said transparent member, said reflect portions forming outlines of a symbol, reflecting an incident light outward of said transparent member for indicating said symbol in brilliancy;
   wherein said transparent member is said front cover.

4. A lens-fitted photo film unit as described in claim 3, wherein said symbol is letters.

5. A lens-fitted photo film unit in which an unexposed filmstrip is preloaded, comprising:
   a transparent member disposed in an outer surface of said lens-fitted photo film unit; and
   reflect portions provided on an inner surface of said transparent member, said reflect portions forming outlines of a symbol, reflecting an incident light outward of said transparent member for indicating said symbol in brilliancy;
   wherein said transparent member is made of plastics mixed with fluorescent dyes.

6. A lens-fitted photo film unit in which an unexposed filmstrip is preloaded, comprising:
   a transparent member disposed in an outer surface of said lens-fitted photo film unit; and
   reflect portions provided on an inner surface of said transparent member, said reflect portions forming outlines of a symbol, reflecting an incident light outward of said transparent member for indicating said symbol in brilliancy;
   wherein said reflect portions are grooves formed in V-shape.

7. A lens-fitted photo film unit in which an unexposed filmstrip is preloaded, comprising:
   a transparent member disposed in an outer surface of said lens-fitted photo film unit; and
   reflect portions provided on an inner surface of said transparent member, said reflect portions forming outlines of a symbol, reflecting an incident light outward of said transparent member for indicating said symbol in brilliancy;

and further comprising a crimp process portion formed around said reflect portion.

8. A lens-fitted photo film unit in which an unexposed filmstrip is preloaded, comprising:

a transparent member disposed in an outer surface of said lens-fitted photo film unit; and reflect portions provided on an inner surface of said transparent member, said reflect portions forming outlines of a symbol, reflecting an incident light outward of said transparent member for indicating said symbol in brilliancy;

wherein the portion of the inner surface of the transparent member upon which the reflect portions are provided directly overlies a light-tight portion of a main body of the lens-fitted photo film unit.

9. The lens-fitted photo film unit of claim 8, wherein the light-tight portion of the main body contains the unexposed filmstrip.

10. A lens-fitted photo film unit in which an unexposed filmstrip is preloaded, comprising:

a transparent member disposed in an outer surface of said lens-fitted photo film unit; and reflect portions provided on an inner surface of said transparent member, said reflect portions forming outlines of a symbol, reflecting an incident light outward of said transparent member for indicating said symbol in brilliancy;

wherein the portion of the inner surface of the transparent member upon which the reflect portions are provided directly overlies a portion of a main body of the lens-fitted photo film unit containing the unexposed filmstrip.

* * * * *